United States Patent [19]

Narisawa et al.

[11] Patent Number: 4,525,491
[45] Date of Patent: Jun. 25, 1985

[54] PROCESS FOR PRODUCING A POLYURETHANE ELASTOMER BY REACTION INJECTION MOLDING

[75] Inventors: Shigeyuki Narisawa, Yokohama; Masahiko Funaki, Chigasaki; Hiroaki Kojima; Kazuhiko Kuga, both of Yokohama, all of Japan

[73] Assignee: Asahi Glass Company, Ltd., Tokyo, Japan

[21] Appl. No.: 563,516

[22] Filed: Dec. 20, 1983

[30] Foreign Application Priority Data

Dec. 24, 1982 [JP] Japan .................. 57-225784
Apr. 8, 1983 [JP] Japan .................. 58-60985

[51] Int. Cl.$^3$ ............................. B29D 27/00
[52] U.S. Cl. ................... 521/174; 264/45.3; 264/45.5; 264/53; 264/54; 264/328.6; 264/DIG. 83; 521/51
[58] Field of Search ............ 264/300, DIG. 83, 51, 264/53, 54, 328.6, 45.3, 45.5; 521/174, 51

[56] References Cited

U.S. PATENT DOCUMENTS

| 3,393,243 | 7/1968 | Cuscurida . | |
| 3,427,256 | 2/1969 | Milgrom | 526/273 X |
| 3,427,334 | 2/1969 | Belner | 526/90 X |
| 3,427,335 | 2/1969 | Herold | 526/90 X |
| 4,220,727 | 9/1980 | Godlewski | 264/300 X |
| 4,440,705 | 4/1984 | Nissen et al. | 521/174 X |

FOREIGN PATENT DOCUMENTS

| 54-30110 | 3/1979 | Japan . |
| 54-44720 | 4/1979 | Japan . |
| 56-38322 | 4/1981 | Japan . |
| 56-43322 | 4/1981 | Japan . |
| 57-55291 | 11/1982 | Japan . |

Primary Examiner—Philip Anderson
Attorney, Agent, or Firm—Oblon, Fisher, Spivak, McClelland & Maier

[57] ABSTRACT

A process for producing a shaped article of a non-cellular or microcellular polyurethane elastomer by reaction injection molding by using at least two components of (A) a polyol component comprising a high molecular weight polyol and a chain extender as essential ingredients and (B) an isocyanate component comprising a polyisocyanate compound as essential ingredient, characterized in that substantially all or at least 80% by weight of said high molecular weight polyol is composed of a polyoxyalkylene polyol, and the polyoxyalkylene polyol is a single or mixed polyoxyalkylene polyol which has an average hydroxyl number of from 2.0 to 3.5 and an average hydroxyl value of from 15 to 60 and contains at least 5% by weight, in an average, of oxyethylene groups at the terminal portions of the oxyalkylene chain and in which the total oxyethylene group content is, in an average, less than 21% by weight and the average unsaturated monool content is at most 0.085 meq/g.

39 Claims, No Drawings

PROCESS FOR PRODUCING A POLYURETHANE ELASTOMER BY REACTION INJECTION MOLDING

The present invention relates to a process for producing a polyurethane elastomer by reaction injection molding (hereinafter referred to as RIM). More particularly, the present invention relates to a process for producing a polyurethane elastomer which scarcely undergoes a dimensional change upon absorption of water.

It is known to produce a polyurethane elastomer such as a microcellular elastomer or a non-cellular elastomer, by RIM using a high molecular weight polyol, a chain extender and a polyisocyanate compound as the main starting materials. The production of a polyurethane elastomer by RIM is employed in the automobile field for the preparation of various shaped articles, such as external shell structures of automotive bumpers. Further, it is expected that such a process will be employed for the preparation of fenders, door panels, front panels or other external plates of automobiles. As compared with internal parts, such external parts of automobiles including the external bumper shell structures, are required to have good water resistance. However, conventional polyurethane elastomers used for an external bumper shell structure were inferior in the water resistance and had practical problems.

In the conventional polyurethane elastomers, the most serious problems was the dimensional change upon absorption of water. Namely, the polyurethane elastomers were likely to absorb water and undergo a dimensional change upon absorption of the water, thus leading to a deformation of the shaped articles. In order to avoid such a dimensional change by the absorption of water, it has been common to increase the wall thickness of the shaped articles. However, it is extremely uneconomical to increase the wall thickness of the shaped articles simply for the purpose of avoiding the dimensional change upon absorption of water. Further, the choice of the shapes or physical properties of the shaped articles is restricted if the wall thickness is restricted to be thick. Accordingly, in order to essentially solve this problem, it is considered necessary to lower the water absorption property of the polyurethane elastomers.

From the study of the water absorption property of the polyurethane elastomers, it has been found that the water absorption property is attributable to the hydrophilic nature of the oxyethylene groups in the high molecular weight polyoxyalkylene polyol as the starting material. It is conceivable that the problem of the water absorption property can be solved if a polyoxyalkylene polyol containing no oxyethylene groups is used. However, for the polyoxyalkylene polyol to be applicable for RIM, it is essential that such a polyol has oxyethylene groups. Namely, the polyoxyalkylene polyol to be used for RIM, is required to be highly reactive. Accordingly, the polyol is required to have a high content of primary hydroxyl groups, and in order to provide such primary hydroxyl groups, the terminal oxyalkylene groups of the polyoxyalkylene polyol must be oxyethylene groups. A typical polyoxyalkylene polyol of this type is a polyoxyalkylene polyol containing oxyethylene groups at its terminal portions and having a high content of primary hydroxyl groups, which is obtained by adding ethylene oxide to a polyoxyalkylene polyol containing oxypropylene groups alone or oxypropylene groups and oxybutylene groups, as the oxyalkylene groups. Accordingly, it has been considered necessary to use a polyoxyalkylene polyol wherein the content of oxyethylene groups is reduced while maintaining the high contents of the primary hydroxyl groups, in order to solve the problem of the water absorption property.

The average hydroxyl value of the high molecular weight polyoxyalkylene polyol to be used for RIM is within a range of about 15 to about 60. It used to be considered necessary that the proportion of the primary hydroxyl groups, i.e. a ratio of the number of the primary hydroxyl groups to the total number of hydroxyl groups, is at least 80%. For instance, in the case of a polyether triol having a primary hydroxyl group proportion of 85%, the content of oxyethylene groups must be at least about 25% by weight when a polyoxyalkylene triol having a hydroxyl value of 35 is used. Likewise, at least about 20% by weight of oxyethylene groups are required when a polyoxyalkylene triol having a hydroxyl value of 25 is employed. Namely, the lower the hydroxyl value of the polyoxyalkylene polyol (i.e. the greater the molecular weight), the lower the content of the required oxyethylene groups. However, from the viewpoint of the number of oxyethylene groups (hereinafter represented by "units") per one hydroxyl group in the polyoxyalkylene polyol, this means that at least from about 5.5 to about 6.0 units of oxyethylene groups per one hydroxyl group are required in order to bring the proportion of the primary hydroxyl groups to 85% irrespective of the hydroxyl value. Theoretically, the proportion of the primary hydroxyl groups becomes 100% if one unit of oxyethylene group per one hydroxyl group is present. The reason why this does not practically apply, is considered to be such that when ethylene oxide is added to the polyoxyethylene polyol having secondary hydroxyl groups, the addition of the ethylene oxide to the hydroxyl groups is non-uniform, and yet the primary hydroxyl group formed by the addition of one molecule of ethylene oxide, is more reactive with ethylene oxide than the secondary hydroxyl group, whereby even when the number of addition of ethylene oxide increases, the overall proportion of addition to the secondary hydroxyl groups tends to decrease. For these reasons, the reduction of the proportion of the oxyethylene groups in the polyoxyalkylene polyol necessarily brings about a decrease of the proportion of the primary hydroxyl groups, whereby it is impossible to obtain a polyoxyalkylene polyol containing the primary hydroxyl groups in a proportion sufficiently high for RIM. In fact, as will be shown by Comparative Examples given hereinafter, in the production of a polyurethane elastomer with use of a conventional polyoxyalkylene triol having a hydroxyl value of about 26 and an oxyethylene group content of about 8% by weight, the molding time (as represented by the mold-releasing time) is extremely long, and the polyurethane elastomer thereby obtained has poor physical properties and is not practically useful.

Apart from the problem of the above mentioned water resistance, it is also important to improve the moldability of the polyurethane elastomer. The improvement of the moldability is meant not only for the shortening of the above mentioned molding time, but also for the improvement of the packing property.

One of the important factors for the improvement of the moldability is the reactivity of the starting materials, particularly the reactivity of the high molecular weight polyol. In order for the reactivity of the high molecular weight polyol to provide an adequate packing property required for the packing into a mold, it is necessary that the increase of the viscosity in the initial stage of the reaction is small so that it is thereby possible to have a long period of flowable time, and at the same time, it is preferred that the viscosity of the starting material polyol itself is low. Whereas, when the hydroxyl number (the number of functional groups) in the high molecular weight polyol increases beyond 2, the increase of the viscosity in the initial stage of the reaction tends to be great and the molecular weight at the same equivalent (the molecular weight per one hydroxyl group) tends to be great, i.e. the viscosity becomes high. Accordingly, as the high molecular weight polyol, a dihydric polyol is preferred, and a polyoxyalkylene diol is preferred. However, when a polyol having a small hydroxyl number is used, there is problem that the mold-releasing time will thereby be prolonged, because no crosslinking takes place in the case of the dihydric polyol and it takes a relative long period of time until it is adequately polymerized and hardened so that the polymer can be released from the mold.

The releasing time is, of course, dependent also on the reactivity of the polyoxyalkylene diol. The higher the reactivity of the polyoxyalkylene diol, the shorter the releasing time can be made.

When the packing property is required as the main requirement, a polyoxyalkylene diol is preferably used as the main component of the high molecular weight polyol. However, for the above-mentioned reason, in many cases, a tri- or higher-hydric polyoxyalkylene polyol is used in combination therewith in order to shorten the mold-releasing time. To improve the packing property, it is desirable to increase the proportion of the polyoxyalkylene diol, whereas to shorten the mold-releasing time, it is desirable to increase the proportion of the tri- or higher-hydric polyoxyalkylene polyol. It is considered that the only way to solve this mutually conflicting problem is to improve the reactivity of the polyoxyalkylene diol as mentioned above. The improvement of the reactivity of the polyoxyalkylene diol means to increase the content of oxyethylene groups at the terminal portions of the oxyalkylene chain, as mentioned above. However, the presence of an excess amount of oxyethylene groups brings about not only a decrease of the water resistance as mentioned above, but also a deterioration of the physical properties of the polyurethane elastomer. Therefore, even when an improvement of the water resistance is not required, it is required, in many cases, to improve the reactivity of the polyoxyalkylene diol without increasing the content of oxyethylene groups.

The present inventors have taken a challenge to the problem which used to be considered theoretically impossible to solve, and have conducted extensive researches. As a result, it has been found possible to produce a polyurethane elastomer of good quality in the molding time substantially the same as that of conventional process, even when the polyoxyalkylene polyol has a low content of oxyethylene groups, provided that the amount of the unsaturated monool component contained in the high molecular weight polyoxyalkylene polyol is at most 0.085 meq/g. In a conventional polyoxyalkylene polyol having a high proportion of primary hydroxyl groups, which used to be employed for RIM, the amount of the unsaturated monool component used to be at least about 0.12 meq/g when the content of oxypropylene groups is high. The present inventors have made various studies to find out the reason why a good polyurethane elastomer is obtainable by reducing the unsaturated monool content to at most 0.085 meq/g, even when the content of oxyethylene groups is low. However, the reason has not yet been clearly understood (although an assumption will be given hereinafter). At any rate, the effect obtainable by the use of such a polyoxyalkylene polyol is remarkable. Further, the content of oxyethylene groups in the polyoxyalkylene polyol may be thereby reduced. Yet, even when the content of oxyethylene groups is high to some extent, it is thereby possible to obtain a good polyurethane elastomer in good moldability as compared with the conventional polyoxyalkylene polyol having an equal content of oxyethylene groups.

The present invention is concerned with the process for producing a polyurethane elastomer by RIM, which is characterized by the use of the above mentioned specific polyol.

Namely, the present invention provides a process for producing a shaped article of a non-cellular or microcellular polyurethane elastomer by reaction injection molding (RIM) by using at least two components of (A) a polyol component comprising a high molecular weight polyol and a chain extender as the essential ingredients and (B) an isocyanate component comprising a polyisocyanate compound as the essential ingredient, characterized in that substantially all or at least 80% by weight of said high molecular weight polyol is composed of a polyoxyalkylene polyol, and the polyoxyalkylene polyol is a single or mixed polyoxyalkylene polyol which has an average hydroxyl number of from 2.0 to 3.5 and an average hydroxyl value of from 15 to 60 and contains at least 5% by weight, in an average, of oxyethylene groups at the terminal portions of the oxyalkylene chain and in which the total oxyethylene group content is, in an average, less than 21% by weight and the average unsaturated monool content is at most 0.085 meq/g.

Now, the present invention will be described in detail with reference to the preferred embodiments.

The presence of the unsaturated monool component in the polyoxyalkylene polyol is considered to be attributable to the side reaction which takes place during the formation of oxypropylene groups by the addition of propylene oxide. The side reaction may be represented by the following formula.

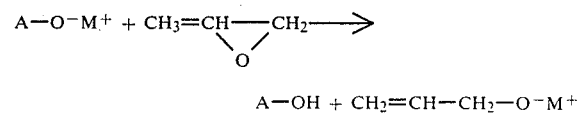

$$A-OH + CH_2=CH-CH_2-O^-M^+$$

A: Residue of the initiator or the polyoxyalkylene polyol with its one hydroxyl group removed $M^+$: Residue of the catalyst such as an alkali metal ion Thus, polyoxyalkylene polyol contains $CH_2=CH-CH_2OH$ or an unsaturated monool component formed by the addition of an alkylene oxide to its hydroxyl group (hereinafter referred to simply as a monool). This monool is of a relatively low molecular weight, and its amount in the polyalkylene polyol is small when represented by the equivalent weight, but relatively large when represented by the molar amount. Therefore, it is considered that ethylene oxide tends to selectively react with the monool at the time of the addition reaction of the ethylene oxide. Accordingly, it is conceivable that among the oxyethylene groups introduced to increase the proportion of primary hydroxyl groups by the conventional process, many of them were distributed to the monool, and no adequate amount of the oxyethylene groups was distributed to the polyoxyalkylene polyol. Thus, it is conceivable that in the conventional polyoxyalkylene polyol, the high proportion of the primary hydroxyl groups includes the primary hydroxyl groups contained in the monool, and the proportion of the primary hydroxyl groups in the polyoxyalkylene polyol excluding those contained in the monool was substantially less than the apparent proportion. Accordingly, it is considered possible that if the amount of the monool is small, the reactivity of the polyoxyalkylene polyol may be maintained at a level equal to the reactivity of the conventional polyoxyalkylene polyol even when the average proportion of the primary hydroxyl groups in the polyoxyalkylene polyol is less than that of conventional polyoxyalkylene polyol.

Further, with respect to the molding time, i.e. the period of time until it becomes possible to remove the shaped particle from the mold, theoretically the molding time is considered to correspond to the time until the crosslinking of the polyurethane has proceeded to a certain stage. Thus, it is conceivable that in the reaction of the hydroxyl groups in the conventional polyoxyalkylene polyol with isocyanate groups, the reaction with the hydroxyl groups in the monool with isocyanate groups takes place preceedingly, because the hydroxyl groups in the monool are mostly primary hydroxyl groups and the proportion of primary hydroxyl groups in the polyalkylene polyol is releatively low, and the monool has a low molecular weight and high reactivity. On the other hand, in the reaction of the monool with a polyisocyanate compound, no crosslinking proceed, and presumably it used to be considered that in order to increase the crosslinking rate of the conventional polyoxyalkylene polyol containing a great amount of the monool, the reactivity must apparently be sufficiently high and accordingly the proportion of primary hydroxyl groups must be accordingly high. Thus, if the content of the monool is minimized, the reaction of the polyoxyalkylene polyol with the polyisocyanate compound will thereby be facilitated, whereby the crosslinking will be faciliated and it is possible to attain the molding time equal to or superior to the conventional molding time even when the proportion of the primary hydroxyl groups is low.

Further, when the monool content is small, it is possible to ensure that the crosslinking be completed within the molding time for the polyurethane elastomer. Thus, no after-curing will be required, or if required, it may be completed in a short period of time. Besides, the polyurethane elastomer thereby obtained has physical properties which are superior to those of the elastomer obtainable by using the conventional polyoxyalkylene polyol containing a great amount of the monool. It is particularly remarkable that while the rate of the dimensional change of the conventional polyurethane elastomer upon absorption of water used to be about 1.1%, it is possible to reduce the rate of the dimensional change upon absorption of the water to a level of 0.8% or less by using a polyoxyalkylene polyol having a small content of oxyethylene groups for the production of the polyurethane elastomer.

In the present invention, the high molecular weight polyol is composed, substantially in its entirety or at least 80% by weight thereof, of a polyoxyalkylene polyol having oxyethylene groups at its terminal portions. The polyoxyalkylene polyol is a single or mixed polyoxyalkylene polyol having an average hydroxyl number of from 2.0 to 3.5, preferably from 2.1 to 2.8, a hydroxyl value of from 15 to 60, preferably from 20 to 40, an average oxyethylene group content of less than 21% by weight, and an average unsaturated monool content (hereinafter referred to as "unsaturated value") of at most 0.085 meq/g, preferably at most 0.080 meq/g. Further, the polyoxyalkylene polyol contains at least 5% by weight, in an average, of oxyethylene groups at the terminal portions of the oxyalkylene chain.

This polyoxyalkylene polyol is preferably composed of (a) polyoxyalkylene triol, (b) a polyoxyalkylene diol or a mixture thereof, or a mixture of at least one of them with other polyoxyalkylene polyols.

One of the main components of the polyoxyalkylene polyol is a polyoxyalkylene triol (a) which has a hydroxyl value of from 15 to 60, an oxyethylene group content of less than 15% by weight and an unsaturated value of at most 0.085 meq/g, and which contains at least 5% by weight of oxyethylene groups at the terminal portions of the oxyalkylene chain. Another main component of the polyoxyalkylene polyol is a polyoxyalkylene diol (b) which has a hydroxyl value of from 15 to 60, an oxyethylene group content of less than 21% by weight and an unsaturated value of at most 0.080 meq/g, and which contains at least 5% by weight of oxyethylene groups at the terminal portions of the oxyalkylene chain. Thus, in the present invention, the polyoxyalkylene polyol comprises from 51 to 100% by weight of one or both of the two polyoxyalkylene polyols and from 0 to 49% by weight of other polyoxyalkylene polyols. Said other polyoxyalkylene polyols will be hereinafter referred to as a polyoxyalkylene polyol (c) and a polyoxyalkylene polyol (d). The polyoxyalkylene polyol (c) is the one which may be used in combination with the polyoxyalkylene triol (a), whereas the polyoxyalkylene glycol (d) is the one which may be used in combination with the polyoxyalkylene diol (b). The polyoxyalkylene polyols to be used in combination with the mixture of the polyoxyalkylene triol (a) and the polyoxyalkylene diol (b) may be one or both of the polyoxyalkylene polyols (c) and (d). Further, the polyoxyalkylene polyol (c) and the polyoxyalkylene polyol (d) may be the same or different from each other.

The hydroxyl value of the polyoxyalkylene triol (a) is preferably 20 to 40, and the oxyethylene group content thereof is preferably at most 10% by weight. It is further preferred that substantially all of the oxyethylene groups are present at the terminal portions of the oxyalkylene chain. A small amount of internal oxyethylene groups may be present. However, if a relatively large amount of internal oxyethylene groups is present, the amount of the terminal oxyethylene groups will have to be reduced correspondingly, whereby the reactivity will be lowered. A small proportion of the oxyalkylene groups in the polyoxyalkylene triol (a) may be oxyalkylene groups other then oxypropylene groups or oxyethylene groups, such as oxybutylene groups. However, it is preferred that the polyoxyalkylene triol (a) is substantially solely composed of trihydric residues of the initiator, oxypropylene groups and oxyethylene groups. Namely, a preferred polyoxyalkylene triol (a) is a polyoxypropylene oxyethylene triol obtained by reacting a trihydric initiator with propylene oxide and ethylene oxide in this order. The polyoxyalkylene triol (a) may be used alone as the polyoxyalkylene polyol in the present invention. However, it is preferably used in combination with at most 49% by weight of the polyoxyalkylene polyol (c). The amount of the polyoxyalkylene polyol (c) is preferably at most 30% by weight. More preferably, the polyoxyalkylene polyol of the present invention comprises from 70 to 98% by weight of the polyoxyalkylene triol (a) and from 2 to 30% by weight of the polyoxyalkylene polyol (c).

The polyoxyalkylene polyol (c) is a polyoxyalkylene polyol other than the polyoxyalkylene triol (a). Its hydroxyl number, hydroxyl value, oxyethylene group content and unsaturated value are not critical and may take any values so long as the corresponding average values in the mixture with the polyoxyalkylene triol (a) fall within the above mentioned ranges of the respective values of the polyoxyalkylene polyol of the present invention. However, polyoxyalkylene polyol (c) is preferably a single polyoxyalkylene polyol or a mixture of polyoxyalkylene polyols, which has a hydroxyl number of from 2.0 to 4.0, a hydroxyl value of from 15 to 60 and an oxyethylene group content of at most 35% by weight. A particularly preferred polyoxyalkylene polyol (c) is a polyoxyalkylene diol having a higher oxyethylene group content, preferably at most 30% by weight, than the polyoxyalkylene triol (a). Like the polyoxyalkylene triol (a), the polyoxyalkylene polyol (c) preferably has substantially all of the oxyethylene groups at the terminal portions of the oxyalkylene chain. However, a relatively small amount of internal oxyethylene groups may be present. Further, the polyoxyalkylene polyol (c) is preferably a polyoxypropylene oxyethylene triol which is composed substantially solely of polyhydric initiator residues, oxypropylene groups and oxyethylene groups, and which has a higher content of oxyethylene groups at the terminal portions of the oxyalkylene chain than the polyoxyalkylene triol (a). A particularly preferred mixture of the polyoxyalkylene triol (a) and the polyoxyalkylene polyol (c) has an average oxyethylene group content of less than 15% by weight, an average hydroxyl number of from 2.1 to 2.8, an average hydroxyl value of from 15 to 60 and an average unsaturated value of at most 0.080 meq/g.

The hydroxyl value of the polyoxyalkylene diol (b) is preferably from 20 to 40. The unsaturated value thereof is preferably 0.07 meg/g, more preferably from 0.065 meq/g. The oxyethylene group content thereof is preferably less than 15% by weight, and the lower limit is preferably 8% by weight. For the same reason as in the case of the above mentioned polyoxyalkylene triol (a), substantially all of the oxyethylene groups of less than 21% by weight should preferably be present at the terminal portions of the oxyalkylene chain. However, as the initiator, a compound having an oxyethylene group, such as ethylene glycol or diethylene glycol may be used. However, this extremely small amount of the oxyethylene group in the initiator residue is not here regarded as the oxyethylene group in the oxyalkylene chain of the polyoxyalkylene diol (b). Like the above mentioned polyoxyalkylene triol (a), the polyalkylene diol (b) is preferably composed substantially solely of dihydric initiator residues, oxypropylene groups and oxyethylene groups. Namely, a preferred polyoxyalkylene diol (b) is a polyoxypropylene oxyethylene diol obtained by reacting a dihydric initiator with propylene oxide and ethylene oxide in this order. The polyoxyalkylene diol (b) may be used alone as the polyoxyalkylene polyol of the present invention, but is preferably used combination of at most 49% by weight of a polyoxyalkylene polyol (d). The amount of the polyoxyalkylene polyol (d) is preferably at most 40% by weight, and its lower limit is 5% by weight, more preferably 10% by weight. A particularly preferred polyoxyalkylene polyol of the present invention comprises from 60 to 90% by weight of the polyoxyalkylene diol (b) and from 10 to 40% by weight of the polyoxyalkylene polyol (d).

The polyoxyalkylene polyol (d) is a polyoxyalkylene polyol other than the polyoxyalkylene diol (b). Its hydroxyl number, hydroxyl value, oxyethylene group content and unsaturated value are not critical, and may take any values so long as the corresponding average values in the mixture with the polyoxyalkylene diol (b) fall within above mentioned ranges of the respective values of the polyoxyalkylene polyol of the present invention. However, the polyoxyalkylene polyol (d) is preferably a single polyoxyalkylene polyol or a mixture of polyoxyalkylene polyols, which has a hydroxyl number of from 2.5 to 4.0, a hydroxyl value of from 15 to 60 and an oxyethylene group content of at most 35% by weight. A particularly preferred polyoxyalkylene polyol (d) is a polyoxyalkylene triol having an oxyethylene group content substantially the same as or greater (preferably at most 30% by weight) than the polyoxyalkylene diol (b). Substantially all of the oxyethylene groups in the polyoxyalkylene polyol (d) are preferably present at the terminal portions of the oxyalkylene chain. However, a relatively small amount of internal oxyethylene groups may be present. Further, the polyoxyalkylene polyol (d) is preferably a polyoxypropylene oxyethylene polyol which is composed substantially solely of polyhydric initiator residues, oxypropylene groups and oxyethylene groups, and which has oxyethylene groups at the terminal portions of the oxyalkylene chain, in an amount substantially the same as or greater than that in the polyoxyalkylene diol (b). In a particularly preferred embodiment, the mixture of the polyoxyalkylene diol (b) and the polyoxyalkylene polyol (d) has an average hydroxyl number of from 2.1 to 2.49, an average unsaturated value of at most 0.070 meq/g and an oxyethylene group content of at least 8% by weight, particularly at least 10% by weight. The total content of the oxyethylene groups is less than 21% by weight in an average and the average hydroxyl value is from 15 to 60, as mentioned above.

A mixture of the polyoxyalkylene triol (a) and the polyoxyalkylene diol (b) is also useful as the polyoxyalkylene polyol of the present invention, this mixture may be used alone or in combination with at most 49% by weight of other polyoxyalkylene polyols. Said other polyoxyalkylene polyols may be the polyoxyalkylene polyol (c), the polyoxyalkylene polyol (d) or the like. The total amount of the polyoxyalkylene triol (a) and the polyoxyalkylene diol (b) is preferably from 60 to 100% by weight, based on the entire polyoxyalkylene polyol. The polyoxyalkylene polyol containing the polyoxyalkylene triol (a) and the polyoxyalkylene diol (b) preferably has an average hydroxyl number of from 2.1 to 2.8, an average hydroxyl value of from 20 to 40, an average oxyethylene group content of less than 21% by weight and average unsaturated value of at most 0.080 meq/g. Further, the lower limit of the above oxyethylene group content is preferably 10% by weight, more preferably 12% by weight.

Now, a common process for producing polyoxyalkylene polyols including the above mentioned polyoxyalkylene polyols (a), (b), (c) and (d), will be described.

The polyoxyalkylene polyol is prepared by the addition of an alkylene oxide to a di- or higher-hydric initiator. The initiator may be a mixture of two or more initiators. As the initiator, there may be mentioned a polyhydric alcohol, an alkanolamine, a mono- or polyamine, a polyhydric phenol, etc. Particularly preferred are polyhydric alcohols having from 2 to 8 hydroxyl groups, especially from 2 to 4 hydroxyl groups. As the initiator, the following specific compounds may be mentioned: ethylene glycol, diethylene glycol, propylene glycol, dipropylene glycol, tripropylene glycol, glycerin trimethylolpropane, hexanetriol, pentaerythritol, diglycerin, dextrose, sorbitol, sucrose, triethanolamine, diethanolamine, ethylenediamine, bisphenol A and bisphenol F.

As the alkylene oxide, an alkylene oxide having from 2 to 4 carbon atoms is preferred. Further, the alkylene oxide may be used in combination with other epoxide such as a halogen-containing alkylene oxide, styrene oxide, glycidyl ether or glycidyl ester. As the alkylene oxide, it is essential to use ethylene oxide, as mentioned above. The above mentioned formation of the monool is attributable to the use of propylene oxide. Unless propylene oxide is used, the above mentioned problem will not come arise. Therefore, the use of propylene oxide is also essential. Accordingly, as the alkylene oxide, it is preferred to employ a combination of substantially two components i.e. propylene oxide and ethylene oxide, or a combination of substantially three components i.e. propylene oxide, butylene oxide and ethylene oxide. It is particularly preferred to employ a polyoxyalkylene polyol wherein at least 60% by weight is composed of oxypropylene groups. From the economical point of view, it is preferred to employ a polyoxyalkylene polyol wherein the oxyalkylene groups are composed substantially solely of oxypropylene groups and oxyethylene groups.

The polyoxyalkylene polyol having a small unsaturated monool content of the present invention may be prepared in accordance with a usual process for the production of polyoxyalkylene polyols, by properly selecting the catalyst components and reaction conditions, or by means of purification or other method for the removal of the monool component. For instance, Japanese Unexamined Patent Publication Nos. 30110/1979, 44720/1979, 38322/1981 and 43322/1981 and U.S. Pat. Nos. 3,427,256, 3,427,334, 3,427,335 and 3,393,243, disclose processes for the preparation of polyoxyalkylene polyols having a small unsaturated monool content. Especially, it is advantageous to properly select the catalyst component and the reaction conditions which are milder than the conventional conditions for the preparation of the polyoxyalkylene polyols. Measurement of the unsaturated monool content may be conducted in accordance with JIS K-1557(1970) "Total Unsaturation Degree" under "Methods for Testing Polyethers for polyurethanes". In this specification, the term "unsaturated value" is used in the same meaning as this total unsaturation degree.

In the present invention, the high molecular weight polyol may be composed substantially solely of the above mentioned polyoxyalkylene polyol. However, it may contain upto 20% by weight of other high molecular weight polyols. As such other high molecular polyols, there may be mentioned, for instance, a polyester polyol; a polyester ether polyol; a polyether polyol such as polyoxytetramethylene polyol produced by a method other than the addition reaction of an alkylene oxide; and a hydrocarbon polymer containing a hydroxyl group, such as polybutadiene containing a hydroxyl group. To reduce the rate of the dimensional change of the polyurethane elastomer upon absorption of water, it is particularly effective to use a hydrocarbon polymer containing a hydroxyl group, which is a hydrophobic polyol. As the hydrocarbon polymer containing a hydroxyl group, it is preferred to use a butadiene homopolymer having a hydroxyl group at each terminal, or a butadiene copolymer obtained by the copolymerization of butadiene with acrylonitrile, styrene or other vinyl monomer. It is also possible to use a high molecular weight polyol obtained by the addition of a small amount of alkylene oxide to such a hydrocarbon polymer containing a hydroxyl group.

The chain extender is composed of a low molecular weight polyol having a molecular weight at most 400 and/or a polyamine compound. Particularly preferred is a low molecular weight polyol having a molecular weight of at most 200. The low molecular weight polyol may preferably be a polyhydric alcohol or alkanolamine having at least 2 hydroxyl groups, more preferably from 2 to 4 hydroxyl groups, or a polyol obtained by the addition of a small amount of an alkylene oxide to the above mentioned polyhydric initiator. Particularly preferred are dihydric alcohol and alkanolamine having from 2 to 4 carbon atoms. As the polyamine, an aromatic diamine substituted by an alkyl group and/or halogen is suitable. Preferred chain extenders include ethylene glycol, 1,4-butanediol, propylene glycol, diethylene glycol, dipropylene glycol, glycerin, trimethylolpropane, diethanolamine and triethanolamine. It is particularly preferred to use ethylene glycol, 1,4-butanediol or a combination of thereof with an alkalolamine. The chain extender is usually used in an amount of from 5 to 40% by weight, preferably from 10 to 30% by weight, based on total amount of the high molecular weight polyol.

It has been found that when a chain extender having an oxyethylene group, such as ethylene glycol, is used as the chain extender, it does not give rise to any adverse effect with respect to the dimensional change of polyurethane elastomer upon absorption of water. The reason is considered to be such that the chain extender will react with a polyisocyanate compound to form a hard block of a polyurethane elastomer, and this hard block has a low water absorption property even when an oxyethylene group is present, or even if it absorbs water, it does not cause a deformation because it is hard.

Whereas, the oxyethylene groups present at the terminal portions of the molecular chain of the high molecular polyol, are considered to be present adjacent to this hard block, and the presence of the oxyethylene groups at such a portion which belongs to a soft block, is considered to give a substantial affect to the dimensional change upon absorption of water, as opposed to the oxyethylene groups present in the hard block.

The polyisocyanate compound includes aromatic, alicyclic, aliphatic and other polyisocyanate compounds having at least two isocyanate groups, or modified derivatives thereof. For instance, there may be mentioned 2,4-tolylene diisocyanate, 2,6-tolylene diisocyanate, 4,4'-diphenylmethane diisocyanate, polymethylenepolyphenyl isocyanate, xylene diisocyanate, isophorone diisocyanate, methylene-bis(cyclohexyl isocyanate) or hexamethylene diisocyanate. As the modified derivatives, there may be mentioned dimers, trimers, prepolymer-type modified derivatives, carbodiimide-modified derivatives, urea-modified derivatives, etc. These polyisocyanate compounds may be used alone or in combination of at least two kinds. Particularly preferred polyisocyanate compounds are 4,4′-diphenylmethane diisocyanate and its carbodiimido modified derivatives or prepolymer-type modified derivatives. The polyisocyanate compound is usually used in an amount of from 90 to 120, preferably from 95 to 110 as represented by the isocyanate index.

In the production of the polyurethane elastomer by RIM, it is usually necessary to use a catalyst in addition to the above mentioned main starting materials. It is also preferred to use a foaming agent. As the catalyst, a variety of tertiary amine catalysts and organic metal compounds such as organic tin compounds, may be employed. These catalysts may be used alone or in combination. In the present invention, the foaming agent is not necessarily required. Even when no foaming agent is used, a slightly foamed elastomer is obtainable due to the presence of water or air dissolved in the starting materials. Further, a non-cellular elastomer is obtainable by removing such water or air. However, it is preferred to use a small amount of a foaming agent, e.g. to improve the moldability. As such a foaming agent, air or water may be used. However, it is preferred to use a halogenated hydrocarbon having a low boiling point. Specifically, there may be mentioned trichlorofluoromethane, dichlorodifluoromethane or methylene chloride. The amount of the foaming agent is at most 15 parts by weight, more preferably from 2 to 10 parts by weight, based on 100 parts by weight of the total amount of the high molecular weight polyol and the chain extender.

Further, various additives may be incorporated as optional additional components. For instance, there may be mentioned a reinforcing fiber, a filler, a coloring agent, an ultraviolet absorber, an antioxidant, a flame retardant and a mold-releasing agent. It is preferred to use a reinforcing fiber, since it serves to decrease the dimensional change upon absorption of water. The reinforcing fiber is believed to improve the stiffness and strength of the polyurethane elastomer. As such a reinforcing fiber, a glass fiber in the form of milled fiber or cut fiber, or wallastonite is suitable. It is used in an amount of at most about 20% by weight based on the entire polyurethane elastomer, whereby an adequate effect is obtainable. The additives including the above mentioned catalyst and foaming agent, are usually added to the polyol components comprising the high molecular weight polyol and the chain extender. However, additives which are inert to an isocyanate group, may be added to the isocyanate component.

RIM is usually conducted by mixing the above mentioned polyol component and the isocyanate component under high speed, then immediately injecting the mixture to the mold, reacting the mixture in the mold, and withdrawing a hardened shaped article. In some cases, the polyol component or the isocyanate component may be added in two portions, or a third component may be used so that the total of three components will be used. The rapid mixing is usually conducted by the collision and mixing of the component, or in some cases, re-mixing may be conducted by providing an after-mixing means in the runner portion. The present invention is useful for the preparation of exterior parts of automobiles, particularly for the production of an exterior shell structure of a bumper. However, the present invention is not limited to such a specific application. It is also applicable to the production of other shaped articles required to be resistant to water.

Now, the present invention will be described in further detail with reference to Examples. However, it should be understood that the present invention is by no means restricted by these specific Examples.

EXAMPLE 1

Each of the mixtures comprising the high molecular weight polyol, the chain extender, etc. as identified in Table 1, was fed to a polyol tank of a RIM machine (Krauss-Maffei PV80/160). On the other hand, the polyisocyanate compound was fed to an isocyanate tank of the RIM machine. RIM was conducted by adjusting the discharge pressure and discharge rate of the RIM machine to 150 kg/cm$^2$ and from 60 to 120 kg/min, respectively, and the liquid temperature of the components to from 30° to 40° C. The shaping mold used was a mold for forming an external shell structure of an automobile bumper, which had a size of 140×120×1400 mm and a wall thickness of 3 mm. The molding was conducted at a mold temperature of from 60° to 70° C. Test samples were cut out from the shaped article thereby obtained, and the various physical properties as shown in Table 1 including the rate of the dimensional change upon absorption of water, were measured. The molding time and the physical properties as identified in Table 1 were measured by the following methods.

Molding time: The period of time from the compeltion of the injection to the time point when it became possible to remove the shaped article from the mold (i.e. the shaped article can be removed from the mold without causing e.g. cracks in the shaped article).

Density: The method based on the substitution by water or an alcohol (ASTM-D792)

Rate of the dimensional change upon absorption of water: The rate of the dimensional change upon absorption of water is represented by $\Delta L$ of the following formula:

$$\Delta L = \frac{t - t_o}{t_o} \times 100$$

where $t_o$ is the length of the test sample of the shaped article immediately after the sample (100×200×3 mm) was post-cured at 100° C. for 3 hours, and t is the length of the sample after it was immersed in warm water at 40° C. for 240 hours.

Flexural modulus: In accordance with ASTM-D790.

Tensile strength: In accordance with JIS-K6301 dumbbell No. 2.

Elongation: In accordance with JIS-K6301 dumbbell No. 2.

The starting materials used were as follows:

I. Polyoxyalkylene polyols

The following Polyols A to G are polyoxypropylene oxyethylene polyols having oxyethylene groups only at the terminal portions, and their hydroxyl numbers, oxyethylene group contents, unsaturated values and hydroxyl values were as follows.

| Polyols | Hydroxyl number | Oxyethylene group content (% by weight) | Unsaturated value (meq/g) | Hydroxyl value |
|---|---|---|---|---|
| Polyol A | 3 | 8 | 0.08 | 26 |
| Polyol B | 3 | 8 | 0.14 | 26 |
| Polyol C | 3 | 15 | 0.12 | 26 |
| Polyol D | 3 | 20 | 0.07 | 28 |
| Polyol E | 2 | 10 | 0.06 | 28 |
| Polyol F | 2 | 20 | 0.08 | 28 |
| Polyol G | 2 | 30 | 0.07 | 38 |

Each of mixed polyoxyalkylene polyols used in this Example was a mixture of the above mentioned polyols, and its composition (% by weight) and the average hydroxyl number, etc. were as follows:

| Mixed polyols | Starting material polyols | Composition (% by weight) | Average hydroxyl number | Average oxyethylene group content (% by weight) | Average unsaturated value (meq/g) | Average hydroxyl value |
|---|---|---|---|---|---|---|
| Polyol(CG) | Polyol C / Polyol G | 76 / 24 | 2.59 | 18.6 | 0.108 | 28.9 |
| Polyol(AG-1) | Polyol A / Polyol G | 76 / 24 | 2.59 | 13.3 | 0.077 | 28.9 |
| Polyol(AG-2) | Polyol A / Polyol G | 85.5 / 14.5 | 2.73 | 11.2 | 0.079 | 27.7 |
| Polyol(AG-3) | Polyol A / Polyol G | 75 / 25 | 2.58 | 13.1 | 0.078 | 29.0 |
| Polyol(FD) | Polyol F / Polyol D | 76 / 24 | 2.17 | 20 | 0.078 | 28 |
| Polyol(ED-1) | Polyol E / Polyol D | 76 / 24 | 2.17 | 12.4 | 0.062 | 28 |
| Polyol(ED-2) | Polyol E / Polyol D | 75 / 25 | 2.18 | 12.5 | 0.063 | 28 |
| Polyol(AG-4) | Polyol A / Polyol G | 73 / 27 | 2.56 | 13.9 | 0.077 | 29.2 |
| Polyol(AG-5) | Polyol A / Polyol G | 77 / 23 | 2.61 | 13.1 | 0.078 | 28.8 |

II. Other high molecular weight polyols

PBd: Polybutadiene glycol having an average molecular weight of about 3000

III. Polyisocyanate compounds [used in an amount to bring the isocyanate index to 105]

Polyisocyanate A: Carbodiimide-modified diphenylmethanediisocyanate (NCO content: 28.5%)

Polyisocyanate B: Prepolymer-type modified diphenylmethanediisocyanate (NCO content: 26%)

IV. Other materials

EG: Ethylene glycol
Catalyst A: Triethylenediamine solution (DABCO 33LV, tradename)
Catalyst B: Dibutyl tin dilaurate
R-11: Trichlorofluoromethane
MFB: Milled glass fiber having average length of about 0.15 mm.

TABLE 1

| No. | 1 | 2 | 3 | 4 | 5 | 6 | 7 | 8 | 9 | 10 | 11 | 12 |
|---|---|---|---|---|---|---|---|---|---|---|---|---|
| Starting materials | | | | | | | | | | | | |
| Polyols | (CG) | B | A | (AG-1) | (AG-2) | (AG-1) | (AG-3) | (FD) | (ED-1) | (ED-2) | (AG-4) | (AG-5) |
| Amounts of polyols (wt. part) | 83 | 83 | 83 | 83 | 83 | 83 | 81 | 83 | 83 | 81 | 73 | 86 |
| Amounts of PBd (wt. part) | — | — | — | — | — | — | — | — | — | — | 10 | — |
| Amounts of EG (wt. part) | 17 | 17 | 17 | 17 | 17 | 17 | 10 | 17 | 17 | 10 | 17 | 14 |
| Amounts of Catalyst A (wt. part) | 0.7 | 0.4 | 0.4 | 0.4 | 0.4 | 0.4 | 0.4 | 0.4 | 0.4 | 0.4 | 0.4 | 0.4 |
| Amounts of Catalyst B (wt. part) | 0.06 | 0.08 | 0.08 | 0.08 | 0.08 | 0.08 | 0.08 | 0.08 | 0.08 | 0.08 | 0.08 | 0.08 |
| Amounts of R-11 (wt. part) | 5 | 5 | 5 | 5 | 5 | 5 | 5 | 5 | 5 | 5 | 5 | 5 |
| Amounts of MFB *a (% by weight) | — | — | — | — | — | — | — | — | — | — | — | 10 |
| Isocyanate compounds (Isocyanate index) | A (105) | A (105) | A (105) | A (105) | A (105) | B (105) | B (105) | A (105) | A (105) | A (105) | A (105) | A (105) |
| Physical properties | | | | | | | | | | | | |
| Molding time (second) | 45 | 420 | 120 | 45 | 60 | 55 | 90 | 120 | 90 | 150 | 55 | 60 |

TABLE 1-continued

| No. | 1 | 2 | 3 | 4 | 5 | 6 | 7 | 8 | 9 | 10 | 11 | 12 |
|---|---|---|---|---|---|---|---|---|---|---|---|---|
| Density (g/cm³) | 1.06 | 1.05 | 1.06 | 1.07 | 1.06 | 1.07 | 1.07 | 1.06 | 1.05 | 1.07 | 1.06 | 1.13 |
| Flexural modulus (kg/cm²) | 2510 | 2280 | 2610 | 2810 | 2580 | 3320 | 4560 | 2150 | 2340 | 3590 | 2960 | 3010(∥) 2320(⊥) |
| Dimensional change upon absorption of water (%) | 1.17 | 0.78 | 0.62 | 0.73 | 0.64 | 0.74 | 0.66 | 1.07 | 0.88 | 0.67 | 0.58 | 0.27(∥) 0.66(⊥) |
| Tensile strength (kg/cm²) | 210 | 170 | 201 | 220 | 206 | 235 | 246 | 205 | 215 | 223 | 216 | 242(∥) 220(⊥) |
| Elongation (%) | 190 | 180 | 191 | 206 | 188 | 221 | 186 | 216 | 224 | 198 | 196 | 123(∥) 156(⊥) *b |

*a: % by weight of MFB based on the weight of the entire polyurethane elastomer
*b: (∥) represents a physical property in the direction parallel to the flow of the liquid
(⊥) represents a physical property in the direction perpendicular to the flow of the liquid

EXAMPLE 2

Shaped articles were prepared in the same manner and under the same conditions as in Example 1. As a physical property, the following minimum packing density was measured.

Minimum packing density: The density of the material in a minimum amount required for filling the mold 100%.

As the chain extender, a mixture of ethylene glycol and triethanol amine in a weight ratio of 15/1 (hereinafter referred to as "EG/TEA") was used. However, in No. 10, only ethylene glycol was used.

Except for the high molecular weight polyols, the same materials as used in Example 1 were used. The high molecular weight polyols were the following polyoxyalkylene polyols which were used alone or in combination as a mixture. All of the polyoxyalkylene polyols were polyoxypropylene oxyethylene polyols having oxyethylene groups only at the terminal portions. Their hydroxyl numbers, oxyethylene group contents, unsaturated values and hydroxyl values were as shown below. The composition of each of the mixed polyoxyalkylene polyols is shown by percent by weight. The results thereby obtained are shown in Table 2.

| Polyols | Hydroxyl number | Oxyethylene group content (% by weight) | Unsaturated value (meq/g) | Hydroxyl value |
|---|---|---|---|---|
| Polyol H | 2 | 15 | 0.058 | 29 |
| Polyol I | 2 | 20 | 0.045 | 28 |
| Polyol J | 2 | 13 | 0.040 | 28 |
| Polyol K | 2 | 20 | 0.090 | 29 |
| Polyol L | 2 | 25 | 0.076 | 26 |
| Polyol M | 2 | 30 | 0.034 | 38 |
| Polyol N | 3 | 20 | 0.082 | 28 |
| Polyol P | 3 | 20 | 0.025 | 56 |

| Polyols | Starting material polyols | Composition | Average hydroxyl number | Average oxyethylene group content (% by weight) | Average unsaturated value (meq/g) | Average hydroxyl value (mg KOH/g) |
|---|---|---|---|---|---|---|
| Polyol (HP) | Polyol H / Polyol P | 69 / 15 | 2.2 | 15.9 | 0.052 | 33.8 |
| Polyol (IN) | Polyol I / Polyol N | 64 / 20 | 2.2 | 20.0 | 0.054 | 28.0 |
| Polyol (JP) | Polyol J / Polyol P | 64 / 20 | 2.3 | 14.6 | 0.036 | 34.6 |
| Polyol (KP) | Polyol K / Polyol P | 69 / 15 | 2.2 | 20.0 | 0.078 | 33.8 |

TABLE 2

| | 1 | 2 | 3 | 4 | 5 | 6 | 7 | 8 | 9 | 10 |
|---|---|---|---|---|---|---|---|---|---|---|
| Starting materials | | | | | | | | | | |
| Polyols | H | I | (HP) | (IN) | (JP) | (HP) | K | L | (KP) | N |
| Amounts of polyols (wt. part) | 84 | 84 | 84 | 84 | 84 | 84 | 84 | 84 | 84 | 85 (only EG) |
| Amounts of EG/TEA (wt. part) | 15/1 | 15/1 | 15/1 | 15/1 | 15/1 | 15/1 | 15/1 | 15/1 | 15/1 | 15 |
| Amounts of Catalyst 33LV/DBTDL (wt. part) | 0.4/0.08 | 0.4/0.08 | 0.4/0.08 | 0.4/0.08 | 0.4/0.08 | 0.4/0.08 | 0.4/0.08 | 0.4/0.08 | 0.4/0.08 | 0.4/0.08 |
| Amounts of R-11 (wt. part) | 5 | 5 | 5 | 5 | 5 | 5 | 5 | 5 | 5 | 5 |
| Amounts of MFG *a | — | — | — | — | — | 20.5 | — | — | — | — |

TABLE 2-continued

|  | 1 | 2 | 3 | 4 | 5 | 6 | 7 | 8 | 9 | 10 |
|---|---|---|---|---|---|---|---|---|---|---|
| (wt. part) Isocyanate compounds | A | A | A | B | A | A | A | A | A | A |
| (Cure · time-sec.) | 300 | 90 | 60 | 50 | 80 | 70 | 150 | 90 | 100 | 30 |
| Physical properties |  |  |  |  |  |  |  |  |  |  |
| Density (g/cm$^3$) | 1.06 | 1.07 | 1.05 | 1.07 | 1.06 | 1.13 | 1.06 | 1.05 | 1.06 | 1.05 |
| Flexural modulus (kg/cm$^2$) | 2060 | 2120 | 2430 | 2630 | 2010 | ‖ 3260 ⊥2560 | 2290 | 2790 | 2450 | 2220 |
| Dimensional change upon absorption of water (%) | 0.69 | 0.85 | 0.72 | 0.87 | 0.66 | ‖ 0.26 ⊥0.42 | 0.92 | 1.06 | 0.95 | 0.85 |
| Tensile strength (kg/cm$^2$) | 242 | 256 | 259 | 274 | 241 | ‖ 209 ⊥155 | 244 | 246 | 250 | 245 |
| Elongation (%) | 221 | 236 | 214 | 266 | 208 | ‖ 133 ⊥172 | 256 | 278 | 232 | 204 |
| Minimum packing density (g/cm$^3$) | 0.58 | 0.55 | 0.54 | 0.55 | 0.53 | 0.56 *b | 0.57 | 0.53 | 0.54 | 0.70 |

*a: % by weight of MFG based on the weight of the entire polyurethane elastomer
*b: ( ‖ ) represents a physical property in the direction parallel to the flow of the liquid
(⊥) represents a physical property in the direction perpendicular to the flow of the liquid

EXAMPLE 3

A bumper fascia was molded by means of the same RIM machine as used in Example 1. The molding conditions were as follows:

Materials: Same as No. 3 in Example 2

Mold: 1600 L, fascia mold made of steel, cavity volume of 4.6 liters, average thickness of 3.6 mm Molding conditions: Liquid temperature of 40° C., mold temperature of 70° C., discharge pressure of 150 kg/cm$^2$, discharge rate of 120 kg/min., mold closing time of 40 seconds, molding time of 60 seconds The molding operatation was conducted under the above conditions, whereby good shaped articles having no defects in the outer appearance such as blisters or sink marks, were obtained, which had a weight within a range of from 4.3 to 5.1 kg. The shaped articles had adequate green strength. The shaped articles having an average density of 1.04 g/cm$^3$, had a flexural moldulus of 2250 kg/cm$^2$ and the rate of the dimensional change upon absorption of water was 0.75%.

What is intended to be new and secured by Letters Patent of the United States is:

1. A process for producing a shaped article of a noncellular or microcellular polyurethane elastomer by reaction injection molding by using at least two components of (A) a polyol component comprising a high molecular weight polyol and a chain extender as essential ingredients and (B) an isocyanate component comprising a polyisocyanate compound as essential ingredient, characterized in that substantially all or at least 80% by weight of said high molecular weight polyol is composed of a polyoxyalkylene polyol, and the polyoxyalkylene polyol is a single or mixed polyoxyalkylene polyol which has an average hydroxyl number of from 2.0 to 3.5 and an average hydroxyl value of from 15 to 60 and contains at least 5% by weight, on an average, of oxyethylene groups at the terminal portions of the oxyalkylene chain and in which the total oxyethylene group content is, on an average, less than 21% by weight and the average unsaturated monool content is at most 0.085 meq/g.

2. The process according to claim 1, wherein the polyoxyalkylene polyol comprises from 51 to 100% by weight of (a) a polyoxyalkylene triol having a hydroxyl value of from 15 to 60, an oxyethylene group content of less than 15% by weight and an unsaturated monool content of at most 0.085 meq/g, and/or (b) a polyoxyalkylene diol having a hydroxyl value of from 15 to 60, an oxyethylene group content of less than 21% by weight and an unsaturated monool content of at most 0.080 meq/g and from 0 to 49% by weight of other polyoxyalkylene polyol.

3. The process according to claim 2, wherein the polyoxyalkylene polyol comprises from 70 to 100% by weight of the polyoxyalkylene triol (a) and from 0 to 30% by weight of other polyoxyalkylene polyol (c).

4. The process according to claim 3, wherein the polyoxyalkylene polyol comprises from 70 to 98% by weight of the polyoxyalkylene triol (a) and from 2 to 30% by weight of (c) other polyoxyalkylene polyols.

5. The process according to claim 3, wherein the polyoxyalkylene polyol has an average oxyethylene group content of less than 15% by weight.

6. The process according to claim 3, wherein the polyoxyalkylene polyol has an average hydroxyl number of from 2.1 to 2.8.

7. The process according to claim 3, wherein the polyoxyalkylene polyol has an average hydroxyl value of from 20 to 40.

8. The process according to claim 3, wherein the polyoxyalkylene polyol has an average unsaturated monool content of at most 0.080 meq/g.

9. The process according to claim 2, wherein the polyoxyalkylene triol (a) is a polyoxypropylene oxyethylene triol wherein substantially all of the oxyethylene groups are present at the terminal portions of the oxyalkylene chain.

10. The process according to claim 9, wherein the polyoxyalkylene triol (a) has an oxyethylene group content of at most 10% by weight.

11. The process according to claim 9, wherein the polyoxyalkylene triol (a) has a hydroxyl value of from 20 to 40.

12. The process according to claim 9, wherein the polyoxyalkylene triol (a) has an unsaturated monool content of at most 0.080 meq/g.

13. The process according to claim 3, wherein the polyoxyalkylene polyol (c) is a polyoxypropylene oxyethylene polyol having an oxyethylene group content of at most 35% by weight.

14. The method according to claim 13, wherein the polyoxyalkylene polyol (c) is a polyoxypropylene oxyethylene diol having an oxyethylene group content of at most 30% by weitht.

15. The process according to claim 2, wherein polyoxyalkylene polyol comprises from 60 to 95% by weight of the polyoxyalkylene diol (b) and from 5 to 40% by weight of (d) other polyoxyalkylene polyol.

16. The process according to claim 15, wherein the polyoxyalkylene polyol comprises from 60 to 90% by weight of the polyoxyalkylene diol (b) and from 10 to 40% by weight of the polyoxyalkylene polyol (d).

17. The process according to claim 15, wherein the polyoxyalkylene polyol has an average oxyethylene group content of at least 8% by weight.

18. The process according to claim 15, wherein the polyoxyalkylene polyol has an average hydroxyl number of from 2.1 to 2.49.

19. The process according to claim 15, wherein the polyoxyalkylene polyol has an average hydroxyl value of from 20 to 40.

20. The process according to claim 15, wherein the polyoxyalkylene polyol has an average unsaturated monool content of at most 0.070 meq/g.

21. The process according to claim 2, wherein the polyoxyalkylene diol (b) is a polyoxypopyleneoxyethylene diol wherein substantially all of the oxyethylene groups are present at the terminal portions of the oxyalkylene chain.

22. The process according to claim 21, wherein the polyoxyalkylene diol (b) has an oxyethylene group content of less than 15% by weight.

23. The process according to claim 21, wherein the polyoxyalkylene diol (b) has a hydroxyl value of from 20 to 40.

24. The process according to claim 21, wherein the polyoxyalkylene diol (b) has an unsaturated monool content of at most 0.070 meq/g.

25. The process according to claim 15, wherein the polyoxyalkylene polyol (d) is a polyoxypropyleneoxyethylene polyol having an oxyethylene group content of at most 35% by weight.

26. The process according to claim 25, wherein the polyoxyalkylene polyol (d) has an oxyethylene group content of at most 30% by weight.

27. The process according to claim 2, wherein the polyoxyalkylene polyol comprises from 60 to 100% by weight of a mixture of the polyoxyalkylene triol (a) and the polyoxyalkylene diol (b), and from 0 to 40% by weight of other polyoxyalkylene polyol.

28. The process according to claim 27, wherein the polyoxyalkylene polyol has an average hydroxyl number of from 2.1 to 2.8.

29. The process according to claim 27, wherein the polyoxyalkylene polyol has an average hydroxyl value of from 20 to 40.

30. The process according to claim 27, wherein the polyoxyalkylene polyol has an average oxyethylene content of at least 10% by weight.

31. The process according to claim 27, wherein the polyoxyalkylene polyol has an average unsaturated monool content of at most 0.080 meq/g.

32. The process according to claim 27, wherein substantially all of the components of the polyoxyalkylene polyol are composed of a polyoxypropyleneoxyalkylene polyol wherein substantially all of the oxyethylene groups are preset at the terminal portions of the oxyalkylene chain.

33. The process according to claim 1, wherein the polyoxyalkylene polyol is a mixed polyoxyalkylene polyol which has an average hydroxyl number of from 2.1 to 2.8, an average hydroxyl value of from 20 to 40, an oxyethylene group content of at least 10% by weight and less than 21% by weight and an average unsaturated monool content of at most 0.085 meq/g.

34. The process according to claim 33, wherein the mixed polyoxyalkylene polyol has an average unsaturated monool content of at most 0.080 meq/g.

35. The process according to claim 1, wherein the chain extender is a dihydric or trihydric alcohol and/or alkanol amine.

36. The process according to claim 1, wherein the polyurethane elastomer is a microcellular polyurethane elastomer.

37. A shaped article of a polyurethane elastomer produced by the process according to claim 1.

38. The shaped article according to claim 37, which is an automotive exterior part.

39. The shaped article claim 38, which is the external shell structure of an automotive bumper.

* * * * *